(12) United States Patent
Shu et al.

(10) Patent No.: US 12,499,620 B2
(45) Date of Patent: Dec. 16, 2025

(54) VECTOR DATA PROJECTION AND FEATURE MATCHING TO DETERMINE THREE-DIMENSIONAL STRUCTURE

(71) Applicant: ECOPIA TECH CORPORATION, Toronto (CA)

(72) Inventors: Yuanming Shu, Toronto (CA); Shuo Tan, Campbell, CA (US); Zihao Chen, Toronto (CA); Ruijie Deng, Toronto (CA)

(73) Assignee: Ecopia Tech Corporation, Toronto (CA)

( * ) Notice: Subject to any disclaimer, the term of this patent is extended or adjusted under 35 U.S.C. 154(b) by 370 days.

(21) Appl. No.: 18/319,553

(22) Filed: May 18, 2023

(65) Prior Publication Data

US 2024/0233261 A1    Jul. 11, 2024

Related U.S. Application Data

(60) Provisional application No. 63/498,140, filed on Apr. 25, 2023, provisional application No. 63/479,281, filed on Jan. 10, 2023.

(51) Int. Cl.
*G06T 7/60* (2017.01)
*G06T 17/05* (2011.01)
(Continued)

(52) U.S. Cl.
CPC ............... *G06T 17/05* (2013.01); *G06T 7/60* (2013.01); *G06T 17/10* (2013.01); *G06V 20/176* (2022.01);
(Continued)

(58) Field of Classification Search
None
See application file for complete search history.

(56) References Cited

U.S. PATENT DOCUMENTS 9,159,164 B2    10/2015   Ciarcia
9,317,966 B1     4/2016   Deephanphongs
(Continued)

FOREIGN PATENT DOCUMENTS

CN    109034066 A  * 12/2018 ......... G06F 18/2414
CN    114491743 A    5/2022
(Continued)

OTHER PUBLICATIONS

DeTone, Daniel; Malisiewicz, Tomasz; Rabinovich, Andrew. Deep Image Homography Estimation. 2016. arXiv:1606.03798. https://doi.org/10.48550/arXiv.1606.03798. (Year: 2016).*
(Continued)

*Primary Examiner* — Amandeep Saini
*Assistant Examiner* — Caroline Tabancay Duffy
(74) *Attorney, Agent, or Firm* — Damian Rolfe

(57) ABSTRACT

Methods and systems for determining the height of structures based on imagery of the structures and associated two-dimensional vector data are provided. An example method involves projecting two-dimensional vector data outlining a roof of a structure into images of the structure captured from different perspectives and feature matching the vector data across the imagery to determine a best-matching three-dimensional position for the roof situated at the height of the structure.

20 Claims, 13 Drawing Sheets

(51) Int. Cl.
    *G06T 17/10*   (2006.01)
    *G06V 20/10*   (2022.01)
(52) U.S. Cl.
    CPC ...... *G06T 2210/04* (2013.01); *G06V 2201/12* (2022.01)

(56) References Cited

U.S. PATENT DOCUMENTS

| | | | |
|---|---|---|---|
| 9,568,332 | B2 | 2/2017 | Strassenburg-Kleciak |
| 10,444,954 | B2* | 10/2019 | Zhang ................ G06F 3/04815 |
| 11,776,148 | B1 | 10/2023 | Poglitsch et al. |
| 2003/0014224 | A1* | 1/2003 | Guo ........................ G06T 17/10 703/1 |
| 2017/0206648 | A1* | 7/2017 | Marra .................. G05D 1/0094 |
| 2018/0089833 | A1 | 3/2018 | Lewis |
| 2019/0066322 | A1 | 2/2019 | Mishra et al. |
| 2021/0272358 | A1 | 9/2021 | Stevens et al. |
| 2022/0215645 | A1* | 7/2022 | Lebaron ................ G06V 10/26 |
| 2023/0073366 | A1* | 3/2023 | Hope ........................ G06T 5/80 |
| 2025/0005853 | A1* | 1/2025 | Langerman ............ G06V 20/17 |

FOREIGN PATENT DOCUMENTS

| | | |
|---|---|---|
| CN | 114820976 A | 7/2022 |
| KR | 101585203 B1 | 1/2016 |

OTHER PUBLICATIONS

PCT/IB2024/050210, International Search Report.
PCT/IB2024/050210, Written Opinion of the International Searching Authority.
DeTone, et al., SuperPoint: Self-Supervised Interest Point Detection and Description, arXiv:1712.07629v4 [cs.CV] Apr. 19, 2018.
Liu, X., Zhang, F., Hou, Z., Mian, L., Wang, Z., Zhang, J. and Tang, J., 2021. Self-supervised learning: Generative or contrastive.IEEE transactions on knowledge and data engineering, 35(1), pp. 857-876.
Office Action to U.S. Appl. No. 19/171,996 dated May 8, 2025.
Office Action to U.S. Appl. No. 19/171,996 dated Jun. 18, 2025.

* cited by examiner

VECTOR DATA PROJECTION AND FEATURE MATCHING TO DETERMINE THREE-DIMENSIONAL STRUCTURE

CROSS-REFERENCE TO RELATED APPLICATIONS

This application claims priority to U.S. Provisional Patent Application No. 63/479,281, filed Jan. 10, 2023, and U.S. Provisional Patent Application No. 63/498,140, filed Apr. 25, 2023. The contents of each of the aforementioned applications are incorporated herein by reference in their entirety.

BACKGROUND

The physical structure of objects and buildings in the real world can be extracted from imagery by the application of conventional methods such as photogrammetry, stereoscopic techniques, and structure-from-motion, among other methods. Such structures may be represented in vector data as a set of geometric entities (e.g., polygons, lines, points) and constraints that model the geometric features of the structures. Vector data (i.e., vector maps) may be used to represent two-dimensional and three-dimensional structures in geospatial applications, such as to model individual buildings, groups of buildings, or entire cities.

BRIEF DESCRIPTION OF THE DRAWINGS

FIG. 6A depicts a three-dimensional representation of a structure as a polygon substantially outlining the roof of the structure in three-dimensional space, attributed with the structure's height as a distance from the polygon to the ground. FIG. 6B depicts an equivalent three-dimensional representation of the same structure as a polygon substantially outlining the base of the structure, attributed with the structure's height as a distance from the base of the structure to the roof of the structure. FIG. 6C depicts an equivalent three-dimensional representation of the same structure as a three-dimensional wireframe model to which the height of the structure is inherent.

DETAILED DESCRIPTION

Figure 1:
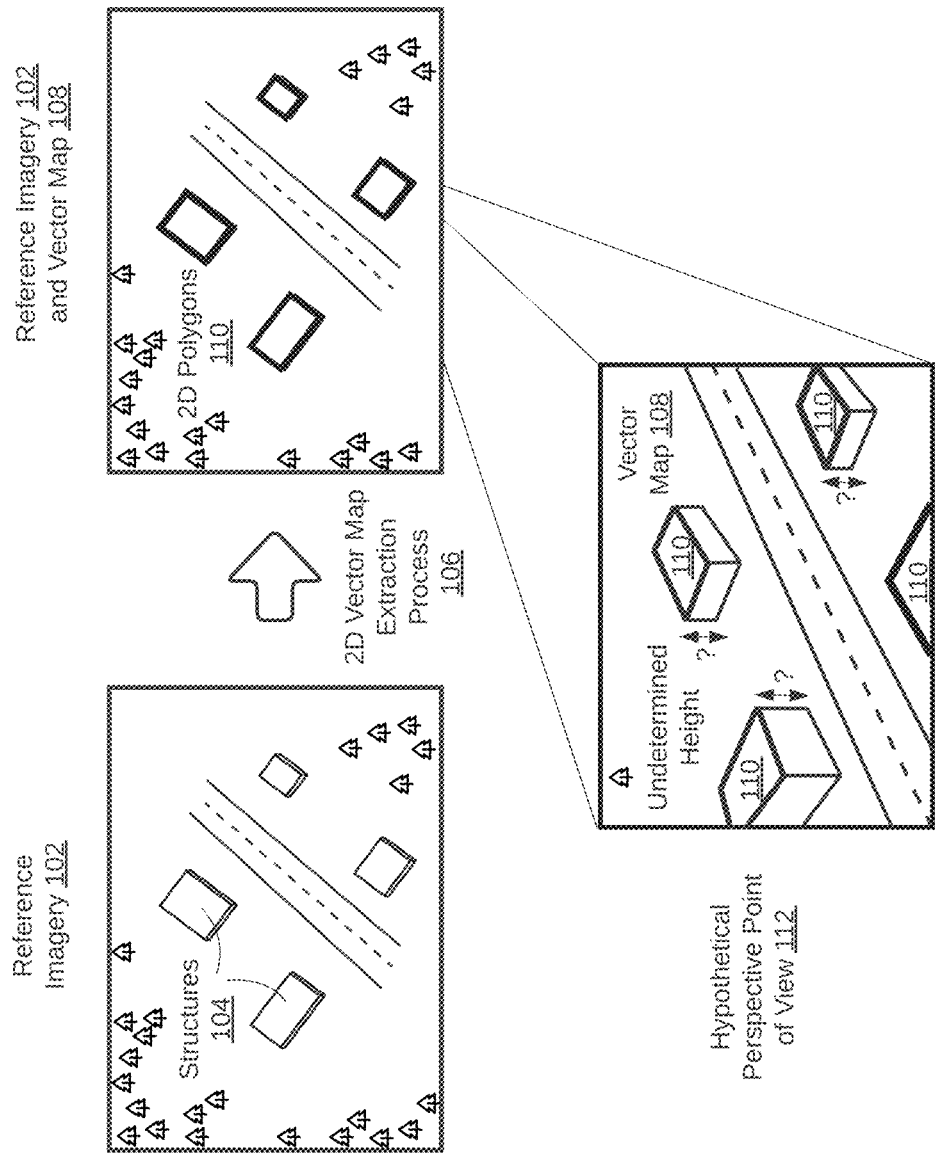
FIG. 1 is a schematic diagram illustrating the generation of two-dimensional vector data representations of structures (e.g., buildings) from overhead imagery.

As set out above, the physical structure of objects and buildings in the real world can be extracted from imagery by the application of various conventional means. More recently, machine learning (i.e., computer vision) methods have been developed that aim to learn, typically based on annotated training data, how to extract vector data representations of structures from single or multiple images.

Such machine learning approaches have been found to be more scalable than conventional methods, particularly in the geospatial context, for generating two-dimensional vector data representations of buildings from overhead imagery. However, the extraction of three-dimensional structure at scale remains a challenge, particularly because the overhead imagery covering a large area may be captured from various camera perspectives and under various lighting conditions.

The present disclosure teaches a scalable approach to extracting three-dimensional structure from imagery that may be particularly applicable in the geospatial context. First, a two-dimensional vector map of one or more structures (e.g., buildings) is obtained or directly extracted from overhead imagery, such as satellite or aerial imagery captured from a near-nadir point of view. The two-dimensional vector map comprises a set of polygons outlining each building, and may be generated manually or by an automated process, including machine learning methods, as described below. Such two-dimensional vector maps may be used to represent the building "footprints" of such structures.

These two-dimensional vector maps are leveraged, in combination with additional imagery, captured from one or more alternate (generally more oblique or more inclined) points of view, in a vector data projection and feature matching process. In this process, feature descriptors underlying the two-dimensional vector data are extracted from several images captured from different perspectives and are matched together to determine the height of the structure, thereby fixing the two-dimensional vector data in three-dimensional space. Once fixed in three dimensions, one of these "roof polygons" can be extruded toward the ground to represent the general three-dimensional shape of the structure. This disclosure also teaches how to capture the height of buildings with complex roof structures (e.g., pitched roofs, multiple roof sections).

The feature matching process is a learned process that may be trained in a supervised or self-supervised manner. Techniques for self-supervised training, which greatly improve the scalability of these methods, are also described.

The techniques described herein may be particularly applicable in the geospatial context for capturing the height of buildings and other structures. However, the techniques described herein may be equally applicable outside the geospatial context to any use case in which two-dimensional vector data may be leveraged with additional imagery to generate three-dimensional vector data.

FIG. 1 illustrates the generation of two-dimensional vector data representations of structures derived from overhead imagery. In FIG. 1, reference imagery 102 depicts an area of interest containing several structures 104. A structure 104 may include any manmade structure such as a building (commercial or residential), or any other structure of a size and three-dimensional shape that may be discerned from overhead imagery. Generally, a structure 104 that may be particularly suitable for the techniques described in this disclosure will have a generally planar roof structure from which a two-dimensional polygonal outline of the structure 104 may be accurately discerned (e.g., an apartment building with a generally flat roof). However, as will be seen below, structures 104 with complex roof geometry (e.g., houses with pitched roofs) and even structures 104 with multiple sections of varying height may also be suitable for the techniques described in this disclosure.

The reference imagery 102 is captured from a substantially "top-down" point of view, and thus may be referred to generally herein as being captured from an "overhead" point of view. However, the terms "overhead" and "top-down" should be interpreted broadly to refer to various types of imagery such as orthographic imagery, nadir, or near-nadir imagery, but may also include off-nadir imagery and even oblique imagery. In any case, such imagery should allow a view of substantially all of the outline of the roof of the structures 104, for reasons that will be made clear later in this disclosure. On its own, the reference imagery 102 is to be generally understood to be limited in its ability to yield height information about the structures 104.

A two-dimensional vector map extraction process 106 can be applied to the reference imagery 102 to generate a vector map 108 (i.e., vector data) comprising two-dimensional representations of the structures 104 depicted in the reference imagery 102. In the present example, the resulting vector map 108 comprises a set of two-dimensional polygons 110, georeferenced to the reference imagery 102, each two-dimensional polygon 110 defining an outline or boundary (i.e., shape) and a location of a respective structure 104 in two dimensions. In other examples, the vector map 108 may comprise a set of elements representing key features of such polygons 110 (e.g., corner points), and may even include one or more points within the boundaries of the polygons 110 (e.g., centroid). In any case, the vector data in the vector map 108 is georeferenced to an X-Y plane that may roughly correspond to the "ground" plane.

The two-dimensional vector map extraction process 106 may refer to any number of methods for producing two-dimensional representations of structures (i.e., buildings) from overhead imagery. For example, the process 106 may refer to a manual process by which a user operator manually annotates a single reference image with points and/or lines traced around the roofs of the structures 104 using various drawing tools made available through a user interface. In other examples, the process 106 may be a semi-automatic or substantially automatic process, and may involve methods such as object detection, boundary detection, key point detection, feature detection, other machine vision techniques, and/or other algorithms in the generation of two-dimensional representations of the structures 104. One such example process is described in U.S. patent application Ser. No. 17/731,769, entitled MACHINE LEARNING FOR VECTOR MAP GENERATION, filed Apr. 28, 2022, which is hereby incorporated by reference in its entirety.

It is important to note that the two-dimensional vector map extraction process 106 produces vector data around the roofs of the structures 104 (i.e., around the top or height of the structures 104), as opposed to the footprints (i.e., base) of the structures 104. This is not only because the bases of the structures 104 will tend to be occluded in overhead imagery, but also because having the roof polygons of the structures 104 is important for the vector data projection and feature matching process described further below.

As such, if the process 106 is a manual process, then the user operators are trained to annotate the two-dimensional polygons 110 by tracing around the roofs of the structures 104. If the process 106 is an automated process, the two-dimensional polygons 110 are generated based on the features detected around the roofs of the structures 104.

Although the two-dimensional vector map 108 may accurately reflect the XY shape and positions of the buildings, the two-dimensional polygons 110 at this stage contain no height information about the structures 104 (as illustrated in the hypothetical perspective point of view 112). The height of these polygons 110 (Z dimensions) may be determined by the vector data projection and feature matching process described further below.

Figure 2:
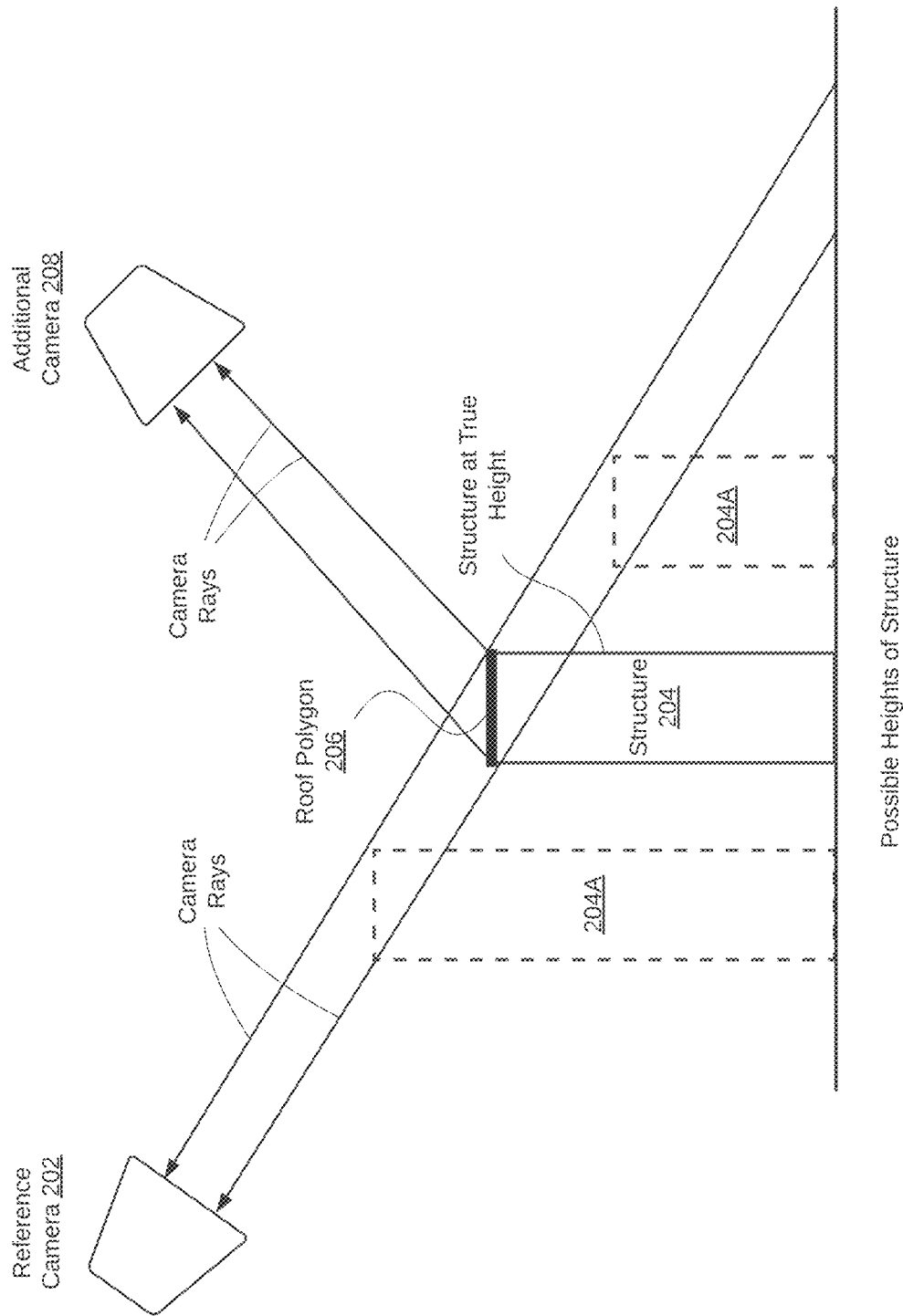
FIG. 2 is a schematic diagram illustrating a potential limitation in generating two-dimensional vector data representations of structures based on imagery captured from a single overhead point of view, namely, that imagery captured from a single overhead point of view may not yield three-dimensional information (e.g., height information).

FIG. 2 further illustrates the limitation when two-dimensional vector maps do not contain height information. As can be seen in FIG. 2, which depicts a structure 204 from a side elevation point of view, a reference camera 202 captures an image of the structure 204 from a substantially overhead point of view. The roof polygon 206 that would outline the roof of the structure 204 in three-dimensional space, if it were fixed at the correct height, is indicated. However, without additional information, there are several possibilities for the height of the structure 204, as indicated in dotted lines at 204A. Indeed, the roof polygon 206 may lie anywhere along the camera rays extending from the reference camera 202. However, with an additional camera 208 that is able to capture additional imagery of the structure 204 from another point of view, the roof polygon 206 may be located in three-dimensional space, in accordance with the vector data projection and feature matching process described below.

Figure 3:
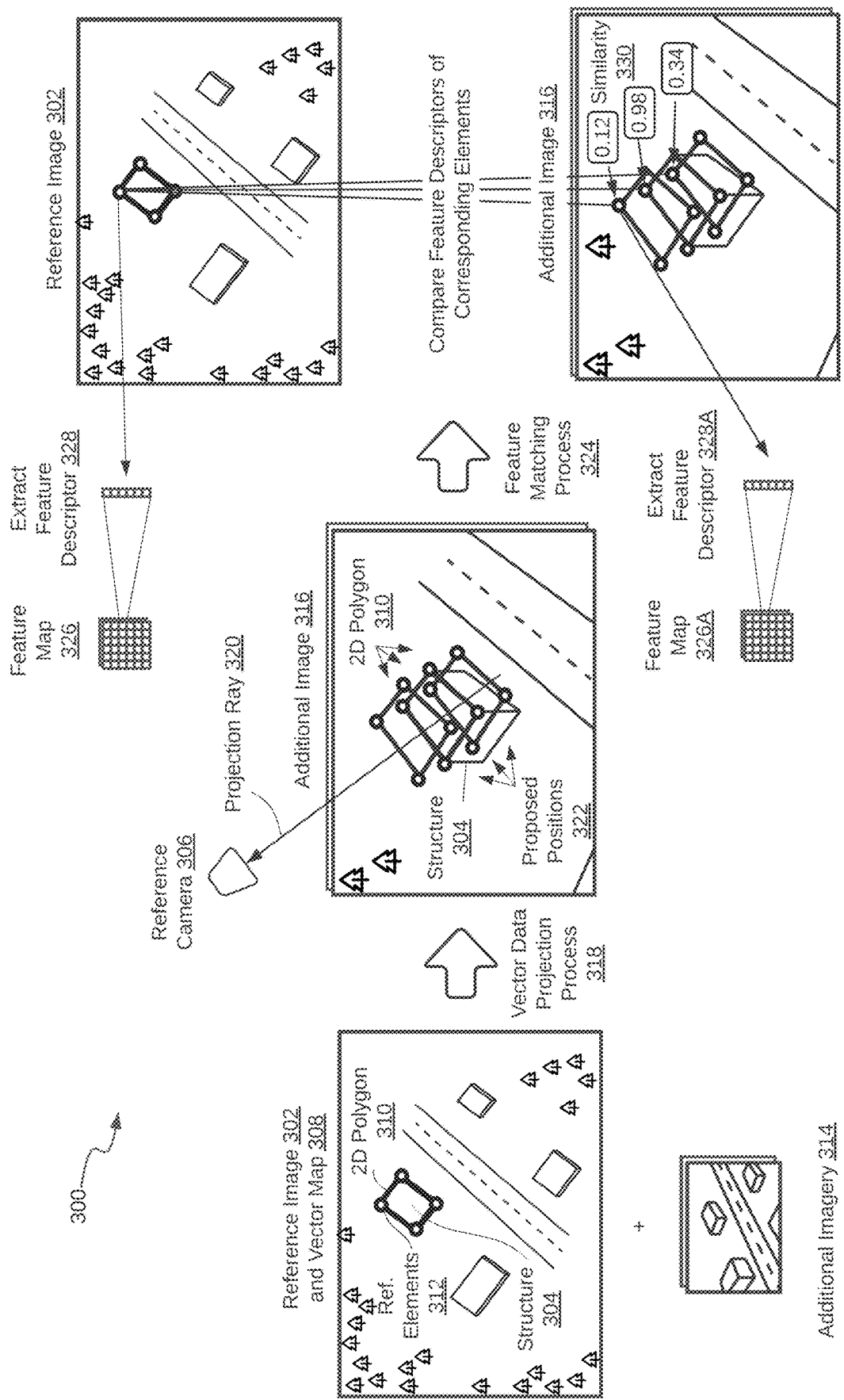
FIG. 3 is a schematic diagram illustrating an example vector data projection and feature matching process. The process is one way in which a two-dimensional vector data representation of a roof of a structure, derived from an overhead point of view, can be leveraged, in combination with additional imagery captured from one or more additional overhead points of view, to determine a three-dimensional position of the roof (i.e., including height).

FIG. 3 is a schematic diagram depicting an example vector data projection and feature matching process 300. As will be shown below, a two-dimensional vector data representation of the roof of a structure derived from overhead imagery can be leveraged, in combination with additional imagery captured from one or more additional points of view, to determine a three-dimensional position of the roof (i.e., including the height of the roof).

In FIG. 3, a reference image 302 is shown with a two-dimensional vector map 308 overlaid. The vector map 308 defines a two-dimensional polygon 310 representing the shape and location of the outline of the roof of a structure 304. The polygon 310 is planar and substantially parallel to the X-Y or "ground" plane. Indeed, the reference image 302, structure 304, vector map 308, and two-dimensional polygon 310 may be similar to the analogous features described with reference to FIG. 1, and thus for further description of these features, reference may be had to the corresponding description of FIG. 1.

The two-dimensional polygon 310 comprises one or more reference elements 312 that are used for the purposes of a feature matching process 324, described below. A reference element 312 may include any geometric feature derived from the vector map 308, such as a point along the polygon 310 (e.g., a corner or any point along a side of the polygon 310), any point bounded within the polygon 310 in fixed relationship to the polygon 310 (e.g., a point of interest identified within the boundary of the polygon 310 or the centroid of the polygon 310), or a higher-order element of the polygon 310 (e.g., a line, combination of lines, combination of points, or other elements in fixed geometric relationship to one another). Although in principle, only a single reference element 312 comprising a single point may be necessary for the feature matching process 324, in most cases, a more accurate result will be obtained with the use of several reference elements 312. For example, the reference elements 312 may comprise a point at each corner of the polygon 310 and an intermediate point between adjacent corners of the polygon 310.

In the present example, it is to be understood that the vector map 308 may have been generated from the reference image 302 as described in FIG. 1, namely through a two-dimensional vector map extraction process. Thus, the polygon 310 contains no height information about the structure 304. However, following the vector data projection process 318 and the feature matching process 324 described herein, which leverage additional imagery 314, the polygon 310 will be fixed in three-dimensional space to substantially the top of structure 304.

The additional imagery 314 may include one or more additional images of the area of interest in which the structure 304 is located, captured from a point of view that is different from the point of view from which the reference image 302 is captured (e.g., like the additional camera 208 of FIG. 2). Depending on the point of view from which the reference image 302 was captured, the additional imagery 314 may include orthographic imagery, nadir, near-nadir imagery, off-nadir imagery, or oblique imagery, provided that the imagery allows a view of substantially all of the outline of the roof of the structure 304. Although this is not limiting, generally, the reference image 302 will typically be captured from a more "top-down" or nadir point of view, and the additional imagery 314 will provide a more oblique point of view. In some examples, the additional imagery 314 may refer to a single image. In other examples, the additional imagery 314 may refer to a plurality of images (e.g., a plurality of nadir, off-nadir, or oblique images). In the present example, the feature matching process 324 is illustrated with the use of one additional image 316 captured from an oblique point of view. When multiple additional images 316 are used, it is to be understood that each additional image 316 will generally depict the structure 304 from a different point of view, and the following steps are to be repeated for each additional image 316.

The vector data projection process 318 involves projecting the two-dimensional polygon 310 (or at least the points comprising each of the reference elements 312 that are to be used in the feature matching process 324) into the additional image 316 at one more proposed positions 322. Each proposed position 322 represents one possibility for the best matching location in three-dimensional space at which the polygon 310 may be fixed to substantially the top of the structure 304. Some of the proposed positions 322 may more closely match the true height of the structure 304 than others.

It is worth noting at this stage that any point in the coordinate system of the reference image 302 may be projected into any additional image 316 anywhere along the epipolar line for that point in that additional image 316. Thus, each point that makes up the reference elements 312 may be projected into each additional image 316 at one or more proposed positions 322 along an epipolar line. However, to save on computational resources, a more simplified projection procedure may be applied. In this simplified procedure, each point that makes up the reference elements 312 may be fixed with respect to one another, and the set of points may, as a group, be projected along a particular camera ray, referred to herein as the "projection ray" 320, and evaluated for the best matching position.

Such a projection ray 320 may be defined in a number of ways. For example, the projection ray 320 may be defined as the camera ray extending from the center of the polygon 310 to the optical center of the reference camera 306 (the camera used to capture the reference image 302). As another example, the projection ray 320 may be defined by determining the epipolar line for each point that makes up the reference elements 312 and determining an "average" epipolar line for the group of points. In any event, the projection ray 320 refers to a camera ray extending from the polygon 310 to the reference camera 306. It has been determined that using this "common" projection ray 320 for each point that makes up the reference elements 312, rather than the epipolar line for each individual point, does not make a significant difference in the ultimately determined three-dimensional position for the polygon 310, while significantly saving on computational resources.

Prior to the vector data projection process 318, at least the intrinsic camera parameters for the cameras associated with the reference image 302 and the additional imagery 314 are obtained or determined (e.g., by bundle adjustment or camera calibration), so that the polygon 310 can be properly projected into each of the additional images 316. Further, the extrinsic camera parameters may also be derived with reference to other information, such as one or more ground control points captured in the reference image 302 and/or additional imagery 316, or with reference to known geospatial coordinates of the cameras used to capture the reference image 302 and/or additional imagery 316. Further, a digital terrain map (DTM), digital surface map (DSM), or other reference data (e.g., reference length) may be generated or obtained and used as described later in this disclosure.

The projected vector data may be spaced apart along the projection ray 320 (or multiple projection rays 320, if applicable, as described above) at predetermined intervals. The predetermined interval may be based on a desired level of accuracy (or the amount of computation power available). In some examples, the predetermined interval may be based on a measurement in the real-world coordinate system. For example, each proposed position 322 may be spaced apart by about one meter (or another distance depending on the desired accuracy). In other examples, particularly in the case where each additional image 316 is of the same resolution, the predetermined interval may be measured in pixels. In other examples, other predetermined intervals may be used, or the selection of the proposed positions 322 may be dynamic, iterative, or made according to another algorithm with the aim of converging to the best matching position.

In some examples, the series of proposed positions 322 may be centered around, or otherwise based on, an initial guess as to the height of the structure 304. An initial guess as to the height of the structure 304 may be determined in a number of different ways. For example, an initial guess for the height of the structure 304 may simply be a heuristic such as the average height of buildings in the area. In other examples, an initial guess for the height of the structure 304 may be determined based on a reference dataset, such as a DSM that provides a rough estimate of the height of the surface of the world over the area. For example, the average height of a DSM over the area covered by the polygon 310 may be extracted from the DSM and taken as the initial guess for the height of the structure 304.

Prior to the feature matching process 324, a feature map 326 is generated for the reference image 302 and a corresponding feature map 326A is generated for each additional image 316. The feature maps 326/326A may be of any suitable dimensionality (i.e., depth, downsizing). A feature descriptor 328 for each reference element 312 is extracted from the feature map 326 (generated from the reference image 302). Similarly, a feature descriptor 328A for each reference element 312 is extracted from each feature map 326A (generated from the additional image 316). Extraction of the feature descriptors 328/328A from the feature map 326 may involve interpolation (e.g., bicubic interpolation), depending on the parameters of the feature map 326/326A (e.g., downsizing).

The feature matching process 324 is then applied to each of the reference elements 312 as projected into the reference image 302 and as projected into each additional image 316 to determine a best matching position for the polygon 310 in three-dimensional space. In particular, the feature matching process 324 involves an element-by-element comparison on the reference elements 312 at each proposed position 322 on the basis of the feature descriptors 328/328A associated with each reference element 312.

As described above, a reference element 312 may include one or more points or a higher-order feature (e.g., a line) associated with the polygon 310. In any case, feature descriptors 328/328A are generated for each compared reference element 312. For example, if the reference elements 312 are points, then the feature descriptors 328/328A are pointwise feature descriptors corresponding to those points in the images, and the feature descriptors 328A derived from each additional image 316 are compared to the corresponding feature descriptors 328 derived from the reference image. If the reference elements 312 are lines, then the feature descriptors 328/328A are feature descriptors corresponding to those lines in the image, and may be calculated by averaging the pointwise feature descriptors corresponding to the points that make up those lines.

The comparison of the feature descriptors 328/328A of each reference element 312 may yield an indication of the similarity of the reference elements 312 as situated at each proposed position in each additional image 316 to the reference elements 312 as situated in the reference image 302. An indication of the similarity of feature descriptors 328/328A may be calculated by any suitable means for comparing the similarity of vectors, such as, for example, cosine similarity. Example values for indications of similarity 330 between feature descriptors 328/328A for one of the reference elements 312 at each proposed position 322 in the additional 316 is provided (e.g., cosine similarity scores of 0.12, 0.98, and 0.34 respectively for the three shown proposed positions 322).

Such similarity may be calculated on an element-by-element basis, and then aggregated across each of the compared reference elements 312 to derive an overall indication of similarity (i.e., similarity score) for the polygon 310 at each proposed position 322 in each additional image 316. Similarity scores may be aggregated in any suitable manner, such as, for example, a simple average or a weighted average. In a weighted average, weights may be determined based on the characteristics of the additional images 316 that are likely to impact accuracy. For example, additional images 316 that are of a higher resolution or a more oblique angle may be weighted more than images of a lower resolution or less oblique angle. Combining the results of each additional image 316, an overall best matching position for the polygon 310 may be determined. For example, the overall best matching position for the polygon 310 across all of the proposed positions 322 in all of the additional images 316 may be directly used as the position for the polygon 310 in three-dimensional space. Alternatively, the best matching position for the polygon 310 may be calculated (e.g., interpolated) based on a regression or other analysis.

In some cases, certain proposed positions 322 may be removed from consideration if one or more heuristics are met. For example, if the similarity scores associated with certain proposed positions 322 are anomalous (e.g., very low), those proposed positions 322 may be removed from consideration. Anomalous scores may be due to factors such as significant occlusion present in the additional image 316 or reference image 302 (that is avoided in other views), mislabeling, or other factors. In such cases, the true matching position for the polygon 310 may be determined with reference to any remaining proposed positions 322 used in the analysis that have not been excluded from consideration (e.g., the proposed positions 322 derived from other additional images 316).

In some cases, certain additional images 316 may be removed from consideration entirely if one or more heuristics are met. For example, if the height determined by the feature matching process 324 as applied to one additional image 316 exceeds or falls outside an expected range, then that additional image 316 may be removed (e.g., if the predicted height of the structure 304 is determined to be less than 1 m (too low) or greater than 1000 m (too high)). In such cases, the true matching position for the polygon 310 may be determined with reference to the remaining additional images 316 that have not been removed from consideration. As another example, if the height determined by the feature matching process 324 as applied to one additional image 316 deviates from the height determined by the feature matching process 324 as applied to other additional images 316 in excess of a threshold amount or proportion, then that additional image 316 may be removed (e.g., if the predicted height of the structure 304 is determined to be 50 m in one additional image 316 but is determined to be around 200 m in three other additional images 316). In such cases, the true matching position for the polygon 310 may be determined with reference to the additional images 316 that are in closest agreement with one another.

In some cases, certain structures 304 may be flagged for producing unstable results. For example, if the height of a structure 304 determined based on a first group of additional images 316 deviates significantly from the height determined based on another group of additional images 316, then that structure 304 may be flagged as producing unstable results (e.g., if, out of a total of eight additional images 316, four additional images 316 yield a predicted height of 100 m, and the other four other additional images 316 yield a predicted height of 200 m). In such cases, those structures 304 may be flagged for follow-up analysis (e.g., human involvement).

Thus, a two-dimensional vector representation of a roof of a structure 304 (i.e., the vector map 308) may be fixed in three-dimensional space by the aforementioned vector data projection process 318 and feature matching processes 324. The feature matching process 324 may be performed at least in part by a machine learning model. That is, a machine learning model may be trained to extract the feature maps 326/326A from which the feature descriptors 328/328A are derived for comparison. Such a machine learning model may comprise any suitable architecture, but will generally include a deep learning architecture, such as a convolutional neural network (CNN), Long Short-Term Memory (LSTM) network, a visual transformer, or other neural network-based architectures. In some examples, such a machine learning model may be pre-trained on basic feature extraction tasks before it is further trained by contrastive learning on images of structures as described below.

Such a machine learning model may be trained in a supervised or self-supervised manner. In the case of self-supervised training, an example of which is provided in FIG. 9 later in this disclosure, such self-supervised training may significantly contribute to the scalability of such a machine learning model.

Once the three-dimensional position of the polygon 310 is fixed in three-dimensional space, then the height of the polygon 310, and therefore the height of the structure 304, is necessarily obtained, at least in the three-dimensional coordinate system. This position/height information may be combined with extrinsic information to determine the real-world height of the structure 304.

Figure 4:
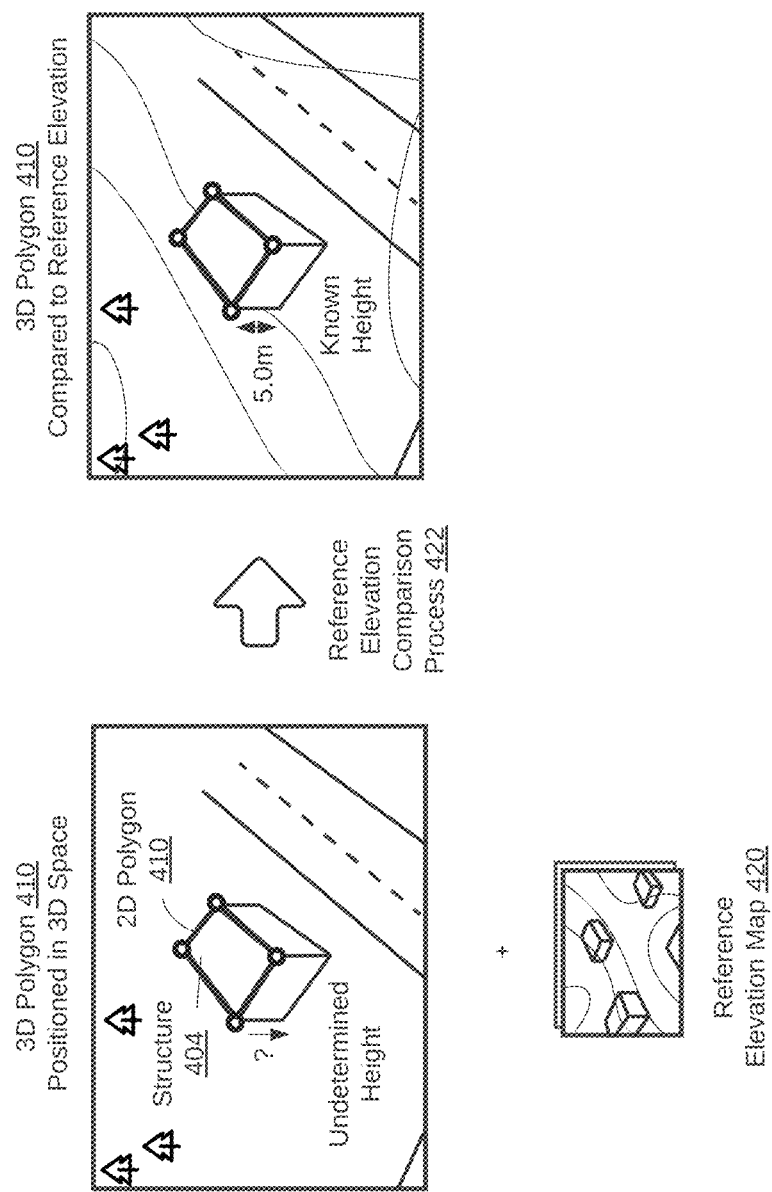
FIG. 4 is a schematic diagram depicting an example process by which a two-dimensional vector data representation of a roof of a structure, located in three-dimensional space by the application of the process described in FIG. 3, is leveraged in combination with a reference elevation to determine the real-world height of the structure.

FIG. 4 is a schematic diagram depicting an example process by which a two-dimensional vector data representation of a roof of a structure, which has been fixed in three-dimensional space by the process 300 described in FIG. 3, is leveraged in combination with a reference elevation to determine the height of the structure. In FIG. 4, vector data defining a polygon 410 that substantially outlines the roof of a structure 404 in three-dimensional space is combined with a reference elevation map 420 to determine the height of the structure 404.

The reference elevation map 420 may include a digital terrain map (DTM), or other surface map that provides a reference elevation beneath the structure 404 to be compared against the three-dimensional position of the polygon 410 to yield the height of the structure 404. In other words, a reference elevation beneath the structure 404 may be extracted from the reference elevation map 420 (e.g., based on the georeferenced location of the polygon 410, at the centroid of the polygon 410 or at any point) and compared to the three-dimensional position of the polygon 410 to determine the distance between the polygon 410 and the reference elevation in the vertical direction. This distance may be taken to be approximately the height of the structure 404 in the real world. This process may be referred to as a reference elevation comparison process 422.

Figure 5:
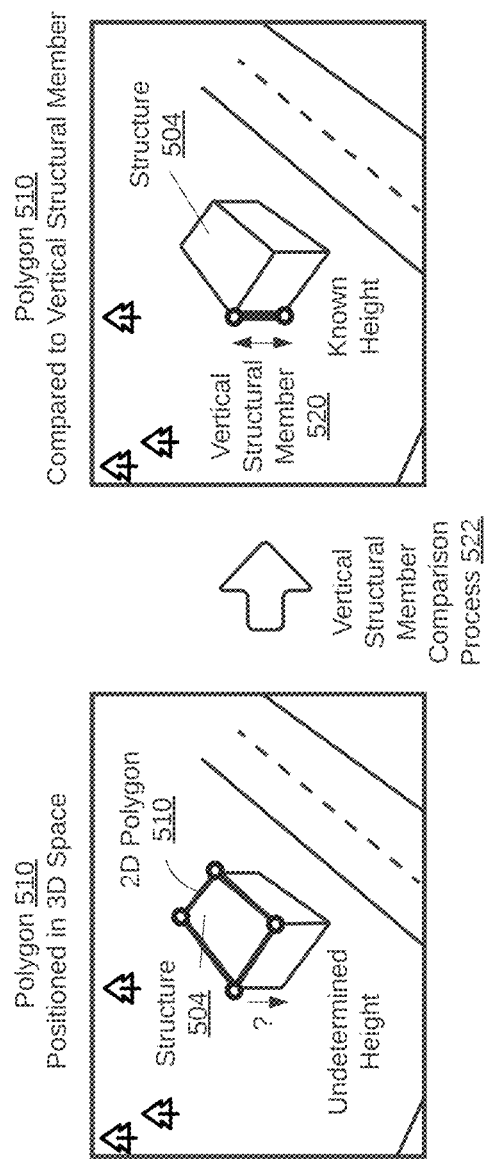
FIG. 5 is a schematic diagram depicting another example process by which a two-dimensional vector data representation of a roof of a structure, located in three-dimensional space by the application of the process described in FIG. 3, is leveraged in combination with a reference length to determine the real-world height of the structure.

As another example, FIG. 5 is a schematic diagram depicting another example process by which a two-dimensional vector data representation of a roof of a structure, fixed in three-dimensional space by application of the process 300 described in FIG. 3, is leveraged in combination with a reference length to determine the height of the structure. In FIG. 5, the height of a polygon 510 defined in vector data that substantially outlines the roof of a structure 504 in three-dimensional space may be determined with reference to the length of a vertical structural member 520 that connects the polygon 510 to a ground plane.

That is, a vertical structural member 520 that connects the roof of the structure 504 to the ground (e.g., an exterior wall of the structure 504) may be identified, and the length of the vertical structural member 520 may be determined, for example, with reference to extrinsic camera parameters, another reference length, or other reference data (i.e., a known length of the vertical structural member 520). This distance may be taken to be the height of the structure 504 in the real world. This process may be referred to as a vertical structural member comparison process 522.

Once the three-dimensional position of a polygon representing the roof of a structure is determined, and a height at which the polygon is situated in the real world is determined, this information may be combined to produce a vector data representation of the structure that contains height information in several ways, as will be seen below in FIGS. 6A-6C.

Figure 6A:
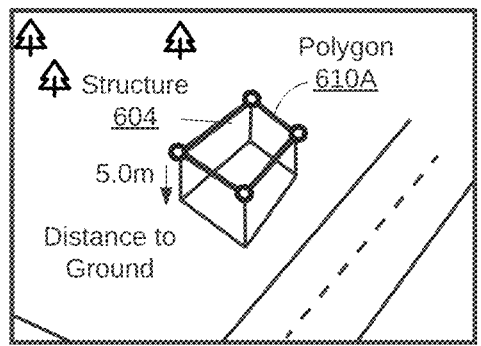
FIGS. 6A-6C are schematic diagrams depicting example alternative vector data representations of equivalent three-dimensional structures.

FIG. 6A depicts a three-dimensional representation of a structure 604 as a polygon 610A that substantially outlines the roof of the structure 604 in three-dimensional space. The height of the structure 604, which may be attributed to the polygon 610A in vector data, is indicated as the distance from the roof of the structure 604 (i.e., the polygon 610A) to the ground.

Figure 6B:
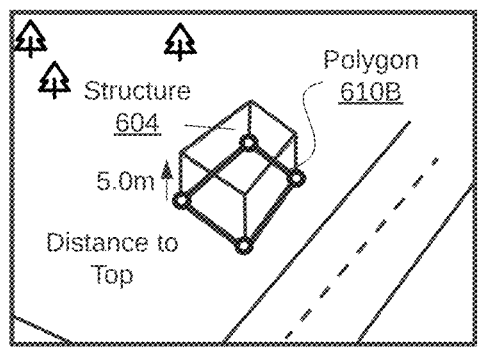

FIG. 6B depicts an equivalent three-dimensional representation of the same structure 604 as a polygon 610B that substantially outlines the base of the structure 604 in three-dimensional space. The height of the structure 604, which may be attributed to the polygon 610B, is indicated as the distance from the base (i.e., footprint) of the structure 604 (i.e., the polygon 610B) to the top (i.e., roof) of the structure.

Figure 6C:
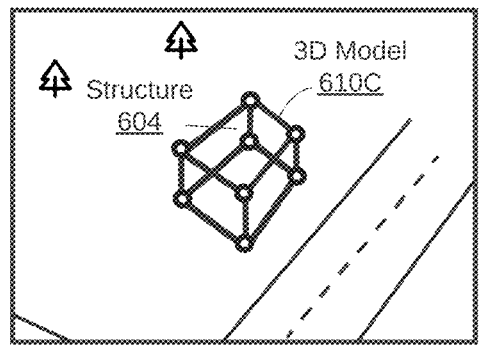

FIG. 6C depicts an equivalent three-dimensional representation of the same structure 604 as a three-dimensional model 610C (i.e., wireframe model). The height of the structure 604 is inherent to the three-dimensional model 610C.

Figure 7:
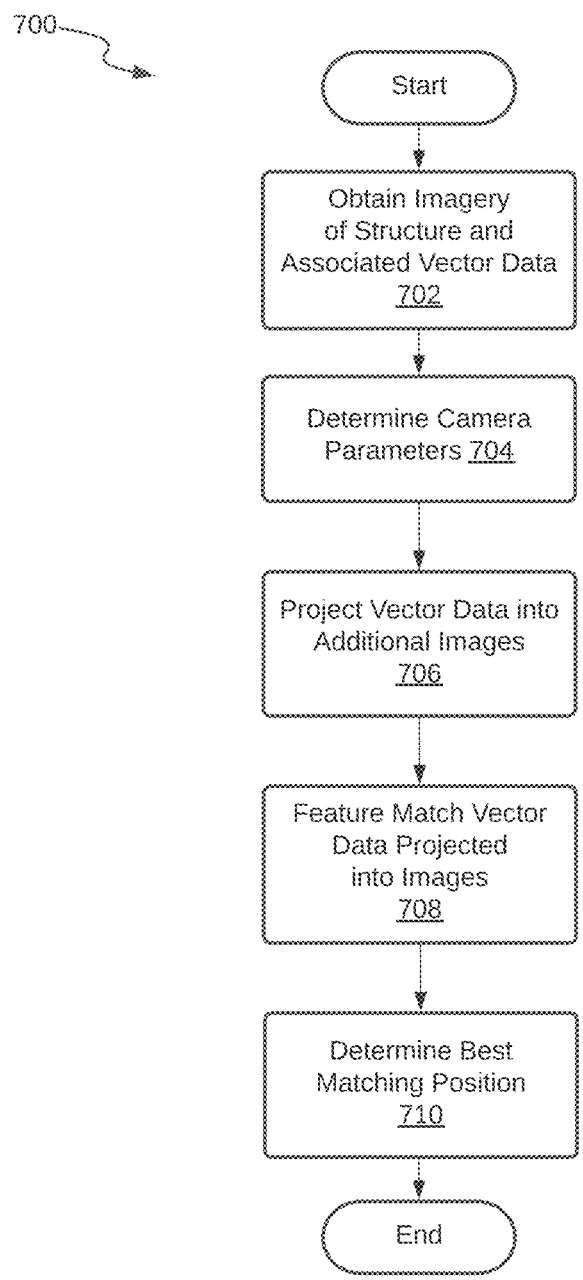
FIG. 7 is a flowchart of an example method for determining the height of a structure based on imagery depicting the structure and a two-dimensional vector data representation of the roof of the structure.

FIG. 7 is a flowchart of an example method 700 for determining the height of a structure based on imagery depicting the structure and a two-dimensional vector data representation of the roof of the structure. The method 700 summarizes the techniques described above, particularly the process 300 of FIG. 3, and certain associated preceding and subsequent steps, and thus, for further description of the operations described in method 700, reference may be had to the preceding disclosure. For convenience, the method 700 is described with reference to a single structure, but it is to be understood that the method 700 can be performed to determine the height of a plurality of structures.

At operation 702, a set of imagery depicting a structure and an associated vector data representation of the roof of the structure is obtained. The set of imagery includes a first image (i.e., a "reference" image) that depicts the structure from a first overhead point of view. The set of imagery also includes one or more additional images depicting the same structure from one or more additional overhead points of view.

The vector data is two-dimensional, and may represent a polygon, or other two-dimensional data such as a set of points and/or lines, that outlines or otherwise indicates the outline of the roof of the structure according to a coordinate system that is substantially parallel to the X-Y plane of the reference image or the "ground" plane. In some examples, the vector data may be generated directly based on the reference image by the application of one or more manual or automatic processes, including machine learning process, as described earlier in this disclosure. In other examples, the vector data may be retrieved from a pre-existing database containing georeferenced polygonal representations of structures generated from an overhead point of view.

At operation 704, the camera parameters for the cameras associated with the obtained imagery are obtained or determined. At least the intrinsic camera parameters are obtained or determined (e.g., bundle adjustment or camera calibration), so that the vector data produced with reference to the reference image can be properly projected into the other images. Extrinsic camera parameters can also be determined with reference to reference data such as one or more ground control points or other location or scale data. Camera calibration may be followed by the generation of a DTM, DEM, the identification of a reference length, or other reference data to be used to determine the height of the structure.

At operation 706, the vector data is projected into each of the additional images. The vector data is projected to one or more proposed positions in each image that may correspond to the position at which the vector data is properly aligned with the roof of the structure at the correct height as viewed from each additional image. Some of the proposed positions may more closely match the true height of the structure than others.

At operation 708, the vector data is feature matched across each of the images. That is, the feature descriptors for the elements of the vector data that are to be compared are extracted from the reference image and from each of the additional images, at each of the positions at which the vector data was projected into the additional images, and these feature descriptors are compared for similarity. The feature descriptors should be most similar at the position at which the vector data most closely aligns with the roof of the structure at the correct height. In some cases, one or more of the proposed positions, or one or more of the additional images, may be excluded from consideration for failing to meet certain criteria.

Optionally, prior to feature matching, each additional image may be transformed so that the structure as depicted in the additional image matches the structure as depicted in the reference image in one or more respects, particularly with respect to scale and/or orientation. That is, each additional image may be scaled and/or rotated, and/or may undergo another transformation, to more closely align the additional image with the reference image. This step may improve the results of the feature matching process.

At operation 710, a best matching position for the vector data is determined. That is, the position at which the vector data most closely matches the correct height of the structure is determined. For example, an aggregate score that compares each feature descriptor as derived from the reference image to its corresponding feature descriptor as derived from each additional image (at each proposed position) is determined, and the position that yields the highest similarity score may be selected as the overall best matching position. This best matching position fixes the vector data (originally two-dimensional) in three-dimensional space. Thus, the height (and the three-dimensional position) of the polygon that represents the outline of the roof of the structure may be determined.

The three-dimensional position and/or height information can then be compared to reference data (e.g., reference elevation, reference length) to determine the real-world height of the structure, as described, for example, with reference to FIG. 4 or FIG. 5. A scaled three-dimensional representation of the structure may then be generated in the form of attributed vector data (e.g., a polygon attributed with height), a three-dimensional wireframe model, or in another form.

The method 700 and/or any of its steps may be embodied in non-transitory machine-readable programming instructions and executable by one or more processors of one or more computing devices, such as servers in a cloud computing environment, which include memory to store programming instructions that embody the functionality described herein and one or more processors to execute the programming instructions (e.g., the data processing devices 820 of FIG. 8 described below).

Figure 8:
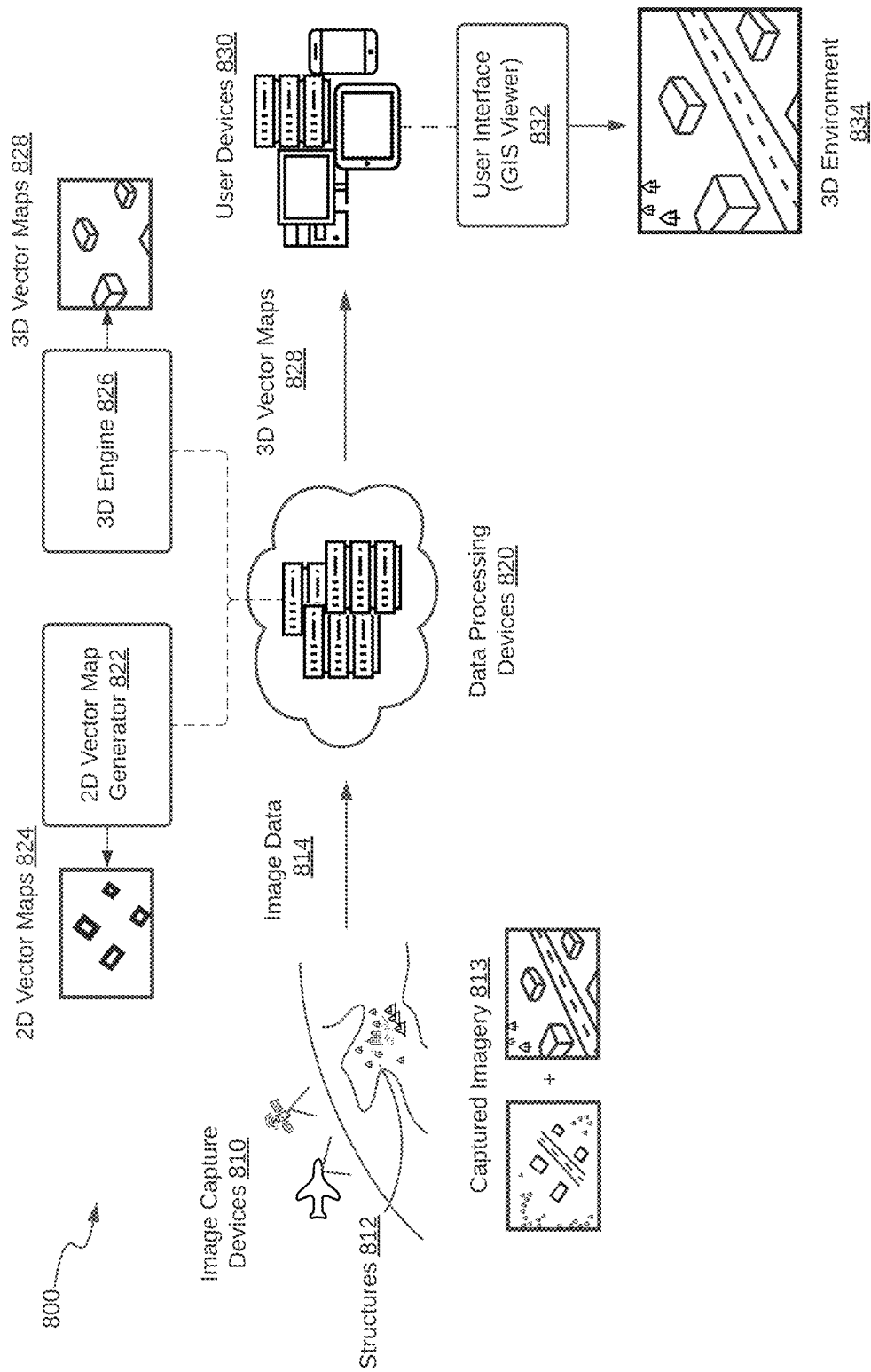
FIG. 8 is a schematic diagram of an example system for determining the height of a structure based on imagery depicting the structure and a two-dimensional vector data representation of the roof of the structure.

FIG. 8 is a schematic diagram of an example system 800 for determining the height of a structure based on imagery depicting the structure and a two-dimensional vector data representation of the roof of the structure. The system 800 is to be understood to represent one example system in which the method 700 of FIG. 7 may be performed.

The system 800 includes one or more image capture devices 810 to capture image data 814 over an area of interest depicting one or more structures 812. An image capture device 810 may include any suitable sensor (e.g., camera) onboard an aircraft, satellite, drone, observation balloon, or other device capable of capturing imagery of an area of interest from an overhead point of view (i.e., remote imagery or geospatial imagery). In particular, such an image capture device 810 is to be capable of capturing a substantially complete view of the roofs of the structures 812, so that vector data outlining the roofs of the structures 812 may be generated and leveraged to later extract the height of the structures 812, as described herein. As described in FIG. 1, the captured imagery 813 may include a wide range of imagery. For illustrative purposes, the captured imagery 813 is depicted as comprising a substantially nadir image and an oblique image. Also as described in FIG. 1, the structures 812 may include any structures with a generally planar roof structure, with complex roof geometry, or even with multiple roof sections of varying height.

The image data 814 may include raw image data in any suitable format generally made available by the image capture devices 810 that captures the imagery. The image data 814 may further include metadata associated with such imagery, including camera parameters (e.g., focal length, lens distortion, camera pose, resolution), geospatial projection information (e.g., latitude and longitude position), or other data, which may be used as described in this disclosure.

The system 800 further includes one or more data processing devices 820 to process the image data 814 and to generate three-dimensional representations of the structures 812 as described herein. The data processing devices 820 include one or more computing devices, such as servers in a cloud computing environment. Such computing devices include one or more communication interfaces to receive/obtain/access the image data 814 and to output/transmit 3D vector maps 828 through one or more computing networks and/or telecommunications networks such as the internet. Such computing devices further include memory to store programming instructions that embody the functionality described herein and one or more processors to execute such programming instructions.

In particular, the data processing devices 820 may store, host, access, run, or execute a 2D vector map generator 822 to generate 2D vector maps 824 and may further store, host, access, run, or execute a 3D engine 826 to leverage the 2D vector maps 824 and image data 814 to generate 3D vector maps 828 as described herein.

The 2D vector map generator 822 represents one or more programs, software modules, or other set of non-transitory machine-readable instructions executable to generate two-dimensional vector data representations (e.g., 2D vector maps 824) from structures based on overhead imagery. The 2D vector map generator 822 may operate similarly to the two-dimensional vector map extraction process 106 of FIG. 1.

The 3D engine 826 represents one or more programs, software modules, or other set of non-transitory machine-readable instructions executable to generate three-dimensional representations of the structures 812 based on the 2D vector maps 824 and additional imagery that depicts the structures 812 from one or more additional points of view. For example, the 3D engine 826 may operate similarly to the process 300 of FIG. 3, in which the 3D engine 826 performs a vector data projection process 318 and associated feature matching process 324 to determine the height of a structure 812 based on a 2D vector map 824 representation of the structure 812 and additional imagery captured from one or more additional points of view.

The 3D vector maps 828 define a set of points, lines, and/or polygons, with associated spatial constraints, that represent the structures 812, as previously described. The 3D vector maps 828 may be transmitted to one or more user devices 830, which may be used to store, view, manipulate, and/or otherwise use such 3D vector maps 828. The structures 812 represented in the 3D vector maps 828 may be defined in any of the forms depicted in FIGS. 6A-6C, namely as polygons attributed with height information or as three-dimensional models. In some examples, the 3D vector maps 828 will contain geometric information only, with no scale information or geospatial referencing. Such geometric models can be used for viewing and manipulation of the geometric features as-is. In other examples, 3D vector maps 828 may contain scale information (e.g., real-world height, as described previously), and may be georeferenced with location information, thereby enabling such 3D vector maps 828 to be appropriately plotted on a map and represented in a Geographic Information System (GIS).

For this purpose, the user devices 830 may store, host, access, run, or execute one or more software programs that process such 3D vector maps 828 (e.g., a GIS viewer). Thus, in the example shown, a user device 830 runs a software program comprising a user interface 832 through which one or more users may view the 3D vector maps 828, shown here to be incorporated into a three-dimensional environment 834. The 3D vector maps 828 may be delivered from the data processing devices 820 to the user devices 830 in any suitable format through any suitable delivery means, including as batch files or through an application programming interface (API).

Such 3D vector maps 828 may be particularly useful for use in virtual or augmented reality environments, gaming, for city planning and land use planning, architectural and engineering work, for automated vehicle navigation, for the generation of a digital twin of a city, and the like.

Figure 9:
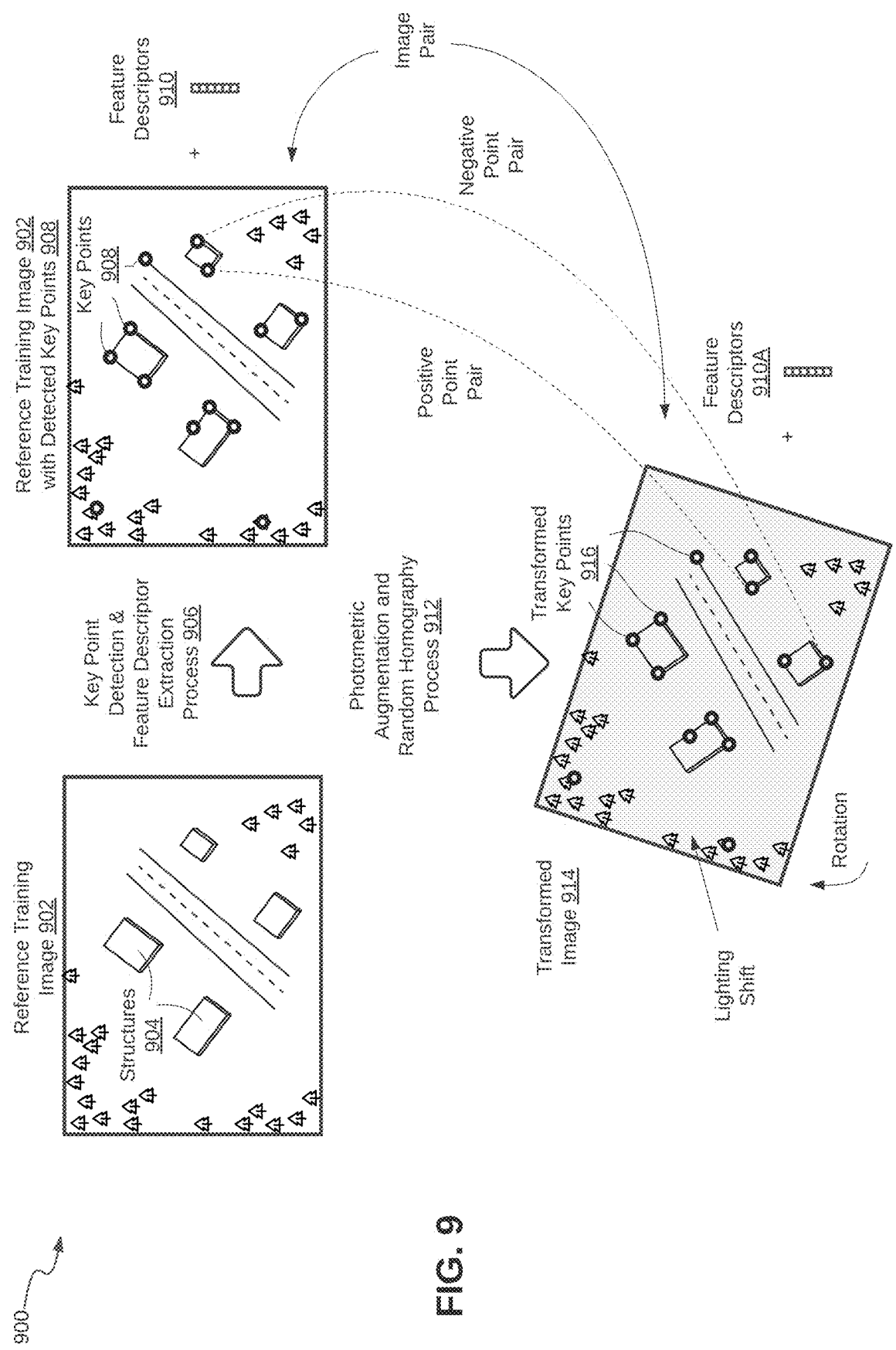
FIG. 9 is a schematic diagram depicting an example process for generating image pairs to be used for the self-supervised training of a feature matching model to be used in the process of FIG. 3.

FIG. 9 is a schematic diagram depicting an example process 900 for generating image pairs to be used for the self-supervised training of a feature matching model to be used in the process 300 described in FIG. 3. It is to be emphasized, however, that the process 900 describes one way in which training images may be generated and used to train a machine learning model for the purposes of the process 300 described in FIG. 3, and that other methods of supervised and self-supervised training may be used to train a machine learning model for the purposes of the process 300 described in FIG. 3.

In FIG. 9, a reference training image 902 is shown that depicts one or more structures 904 from an overhead point of view. A key point detection and feature descriptor extraction process 906 is performed on the reference training image 902 to extract a set of key points 908 and corresponding feature descriptors 910 (i.e., extracted from a feature map). Any suitable key point detection and feature descriptor extractor model may be used. Some of the key points may outline the roofs of the structures 904 depicted therein. However, other key points may be identified at other places and features in the imagery, as shown.

Next, one or more data augmentation techniques may be applied to the reference training image 902 and the set of key points 908 to generate an image pair and corresponding set of key points. For example, a photometric augmentation and/or random homography process 912 may be performed on the reference training image 902 to generate a transformed image 914. For example, the reference training image 902 may undergo a lighting shift, color distortion, blurring, contrast, sharpening, or another photometric augmentation. Further, the reference training image 902 may undergo cropping, rotation, scaling, translation, perspective distortion, or another homographic transformation. The reference training image 902 and the transformed image 914 form an image pair that can be used in contrastive learning. In this illustrative example, the transformed image 914 has been rotated and has undergone a lighting shift. Such photometric augmentations and random homographic transformations may simulate illumination and viewpoint changes between images. In some examples, photometric augmentations may be applied without homographic augmentations, or homographic transformations may be applied without photometric augmentations.

Where a homographic transformation is made, the same homographic transformations made to the reference training image 902 are made to the set of key points 908 so that the transformed image 914 can be associated with a corresponding transformed set of key points 916 that map to the same real-world positions. In any case, a corresponding set of feature descriptors 910A is extracted for the set of transformed key points 916 based on feature extraction performed on the transformed image 914.

Each key point 908 in the reference training image 902 and its corresponding transformed key point 916 in the transformed image 914 may be termed a positive point pair. Conversely, each key point 908 in the reference training image 902 and all non-corresponding transformed key points 916 in the transformed image 914 may be termed a negative point pair. Contrastive learning is performed with respect to the positive pairs and the negative pairs and the corresponding feature descriptors 910/910A. The goal is to maximize the similarity between feature descriptors extracted for points that correspond to one another (positive point pairs) and minimize the similarity between feature descriptors extracted for points that do not correspond to one another (negative point pairs). For example, positive point pairs of low feature descriptor similarity may be punished, and negative point pairs of high feature descriptor similarity may be punished. In other words, the machine learning model may be trained to attract feature descriptors of positive point pairs and repel feature descriptors of negative point pairs. Similarity may be calculated, as described above, by any suitable means such as cosine similarity. Thus, a machine learning model may be trained to recognize a high degree of similarity between the feature descriptors 910/910A of positive point pairs and a low degree of similarity between feature descriptors 910/910A of negative point pairs.

Since in most cases the negative point pairs will greatly outnumber the number of positive pairs, some of the negative point pairs may be excluded from training (e.g., based on one or more criteria), or the impact that negative point pairs have on training may be weighted lower than the impact of positive point pairs.

It is to be noted that although the term "point pair" is used in this discussion for convenience, it is to be understood that such a concept may apply more generally to "element pairs" where the elements to be compared include lines or other geometric elements other than points.

Thus, a machine learning model may be trained in a self-supervised manner to determine feature similarity between corresponding points in image pairs. Such a machine learning model may be leveraged to feature match the corresponding elements of a structure in different images (e.g., for the feature matching process 324 of FIG. 3).

As described above, these techniques may be particularly suitable to determine the height of structures that have a generally planar roof structure. However, these techniques may also be applied to structures with complex roof geometry and even structures with multiple sections of varying height, with appropriate modifications, as described below.

Figure 10:
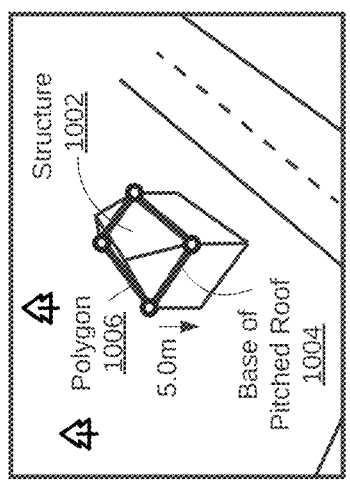
FIG. 10 is a schematic diagram illustrating an example vector data representation of a structure as derived from the methods described herein in the case where the structure has irregular roof geometry.

For an example of a more complicated roof structure, FIG. 10 is a schematic diagram illustrating a structure 1002 with irregular roof geometry, namely a pitched roof (e.g., a residential house with a pitched roof). In this example, the vector data that outlines this structure 1002 should surround the base 1004 of the pitched roof. The base 1004 of the pitched roof provides a generally planar outline of substantially the top of the structure 1002 that can be extracted in two dimensions (e.g., by the 2D vector map extraction process 106 of FIG. 1) and then fixed in three-dimensional space by a feature matching process (e.g., the process 300 of FIG. 3). The resulting vector data is indicated as polygon 1006. Thus, any two-dimensional vector extraction process, whether manual or automatic, should be configured to generate vector data (e.g., a polygon) indicating the base 1004 of the roof structure, and any three-dimensional feature matching process can proceed as described earlier in this disclosure (e.g., FIG. 3).

Figure 11:
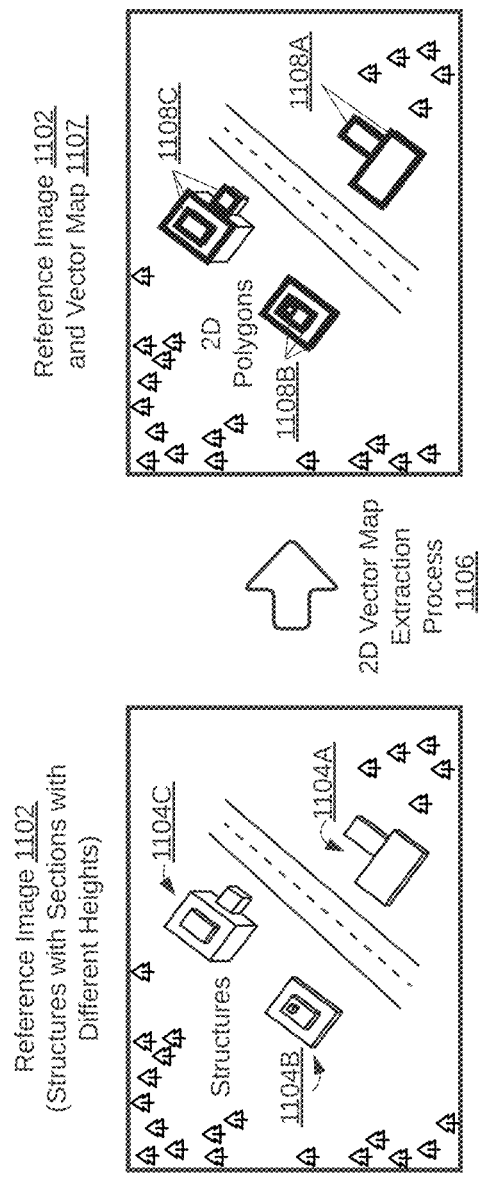
FIG. 11 is a schematic diagram illustrating the generation of two-dimensional vector data representations of structures (e.g., buildings) that have multiple roof sections at different heights.

For another example of a more complicated roof structure, FIG. 11 is a schematic illustrating a reference image 1102 (which may be similar to the reference image 102 of FIG. 1) depicting a number of structures 1104, each comprising multiple roof sections with different real-world heights. For example, the structure 1104A comprises two adjacent roof sections with different heights. As another example, structure 1104B comprises three roof sections which are nested within one another. In other words, the structure 1104B comprises a first level with the largest footprint, a second level with a smaller footprint contained within the footprint of the first level, and a third level with an even smaller footprint contained within the footprint of the second level. As another example, the structure 1104C comprises a combination of adjacent and nested roof sections, each with different heights.

In such an example, a two-dimensional vector map extraction process 1106 (which may be similar to the two-dimensional vector map extraction process 106 of FIG. 1) can be applied to the reference image 1102 to generate a vector map 1107 (which may be similar to the vector map 108 of FIG. 1) comprising a set of two-dimensional polygons 1108, wherein each polygon 1108 outlines a boundary of a particular roof section of a structure 1104. Although each polygon 1108 does not represent a separate buildings, each represents a separate roof structure with its own height. Each polygon 1108 associated with a particular structure 1104 may be grouped together based on the X-Y geometric relationship (e.g., adjacency, nested relationship, or proximity). Thus, the polygon group 1108A comprises two adjacent polygons 1108 outlining the adjacent roof sections of the structure 1104A. As another example, the polygon group 1108B comprises three nested polygons 1108 outlining each level of the structure 1104B. As another example, the polygon group 1108C comprises three polygons 1108 outlining each adjacent or nested roof section of the structure 1104C.

In some cases, the vector map 1107 may be directly leveraged in a vector data projection and feature matching process similar to the process 300 of FIG. 3 to determine a three-dimensional position of each roof section of each structure 1104 independently. However, it may be advantageous to treat each of the polygons within a polygon group 1108A, 1108B, 1108C as "constrained" with respect to one another in the X-Y plane, and to carry this constraint through into the vector data projection and feature matching process, as described below. Maintaining such constraints throughout the vector data projection and feature matching process may ensure that any accurate physical constraints captured in the two-dimensional vector map 1107 (e.g., the constraint that two polygons are adjacent) are not lost.

Figure 12:
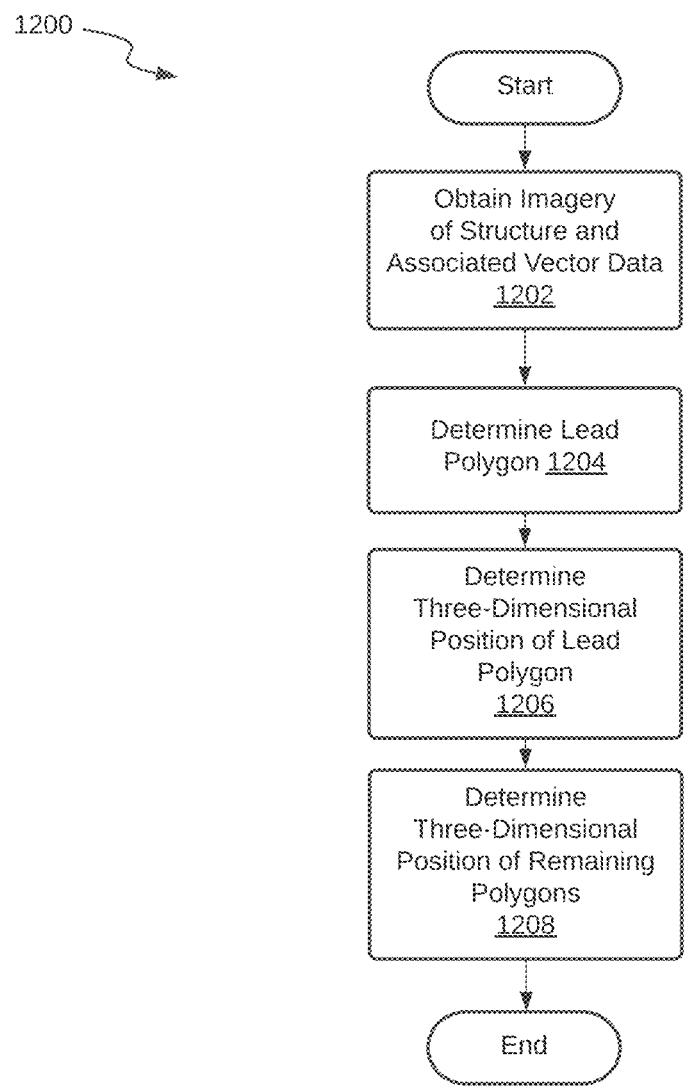
FIG. 12 is a flowchart of an example method for determining the heights of multiple roof sections of a structure based on imagery depicting the structure and a group of two-dimensional vector data representations of the roof sections of the structure.

FIG. 12 is a flowchart of an example method 1200 for determining the heights of multiple roof sections of a structure based on imagery depicting the structure and a group of two-dimensional vector data representations of the roof sections of the structure. The method 1200 may be understood to be similar to the method 700 of FIG. 7 as applied to the case where a structure comprises multiple roof sections.

At operation 1202, a set of imagery depicting a structure and an associated set of two-dimensional vector data representing the roof sections of the structure is obtained. The structure has multiple roof sections at different heights, and thus, may be similar to one of the structures 1104A, 1104B, or 1104C of FIG. 11. The set of imagery includes a first image (i.e., a "reference image") that depicts the structure from a first overhead point of view. The two-dimensional vector data may have been generated with reference to this first image. The set of images also includes one or more additional images depicting the same structure from one or more additional overhead points of view. The two-dimensional vector data includes a group of polygons (e.g., similar to the groups of polygons 1108A, 1108B, 1108C) each representing a distinct roof section of the structure as a set of points and/or lines that outlines or otherwise indicates the outline of such roof sections.

At operation 1204, a "lead", "first", or "most confident" polygon from the group of polygons representing the multiple roof sections of the structure is determined. This "lead"

polygon may represent the polygon in the group of polygons that is most likely to be the most accurate of the group in one way or another. For example, the lead polygon may be the polygon that is most likely to have been most accurately generated based on the two-dimensional vector map extraction process from which it was generated. As another example, the lead polygon may be the polygon that is most likely to be most accurately fixed in three-dimensional space by a vector data projection and feature matching process similar to the process 300 described in FIG. 3. In any case, the lead polygon will serve as an "anchor" or "reference" polygon for the remaining analysis.

The "lead" polygon may be selected in a number of ways. In some examples, the "lead" polygon may be selected based on a heuristic and/or satisfaction of one or more criteria pertaining to the two-dimensional vector data, such as, for example, being the largest polygon (e.g., by perimeter) in the group of polygons. The largest polygon in the group may contain the greatest number of reference elements (i.e., see reference elements 312 in FIG. 3), which may be advantageous for a vector data projection and feature matching process. In another example, the lead polygon may be selected for having the least amount of occlusion as compared to the remaining polygons.

In other examples, the "lead" polygon may be selected based on the results of a previously applied preliminary vector data projection and feature matching process applied to each of the polygons in the group of polygons independently. For example, after each polygon in the group of polygons is independently fixed in three-dimensional space (e.g., by the process 300 of FIG. 3), the "lead" polygon may be selected as the polygon for which the highest similarity score is obtained (i.e., the polygon that is most closely aligned with the roof section it is associated with). Alternatively, the polygon that is fixed at the highest height may be used. After the application of such a preliminary vector data projection and feature matching process, and the lead polygon is selected, the vector data projection and feature matching process may proceed a second time, with the two-dimensional constraints among the polygons in the group enforced, as per the below.

At operation 1206, the three-dimensional position (i.e., height) of the lead polygon is determined. If a preliminary vector data projection and feature matching process was applied, the three-dimensional position of the lead polygon may be readily available. Otherwise, a vector data projection and feature matching process (i.e., similar to the process 300 of FIG. 3) is applied to this lead polygon.

At operation 1208, the three-dimensional position of each of the remaining polygons of the group of polygons is determined. For each of these remaining polygons, the vector data projection and feature matching process is modified to account for the spatial constraints between the polygons as derived from the two-dimensional data. That is, the X-Y coordinates of each of the remaining polygons is fixed with respect to the lead polygon based on the two-dimensional data.

With the X-Y coordinates fixed, a modified vector data projection and feature matching process is performed to determine the Z (height) of each remaining polygon. As in the previously described process (single roof section), for each of the remaining polygons, one or more reference elements derived from the remaining polygon are projected into each of the additional images at one or more proposed positions. However, in this modified process, rather than being spaced apart along a "projection ray" from the polygon to the reference camera, each proposed position is spaced apart in the vertical (i.e., Z) direction. This constraint maintains the X-Y relationships among the polygons derived from the two-dimensional data.

As in the previously described process, at each proposed position, the reference elements are feature matched between the first image and each of the additional images. Similarly, based on the feature matching, a best matching position at which the remaining polygon is most closely aligned with the roof section associated with the remaining polygon in the one or more additional images is determined, thereby fixing the remaining polygon in three-dimensional space and determining its height.

The method 1200 and/or any of its steps may be embodied in non-transitory machine-readable programming instructions and executable by one or more processors of one or more computing devices, such as servers in a cloud computing environment, which include memory to store programming instructions that embody the functionality described herein and one or more processors to execute the programming instructions (e.g., the data processing devices 820 of FIG. 8 described above).

Figure 13:
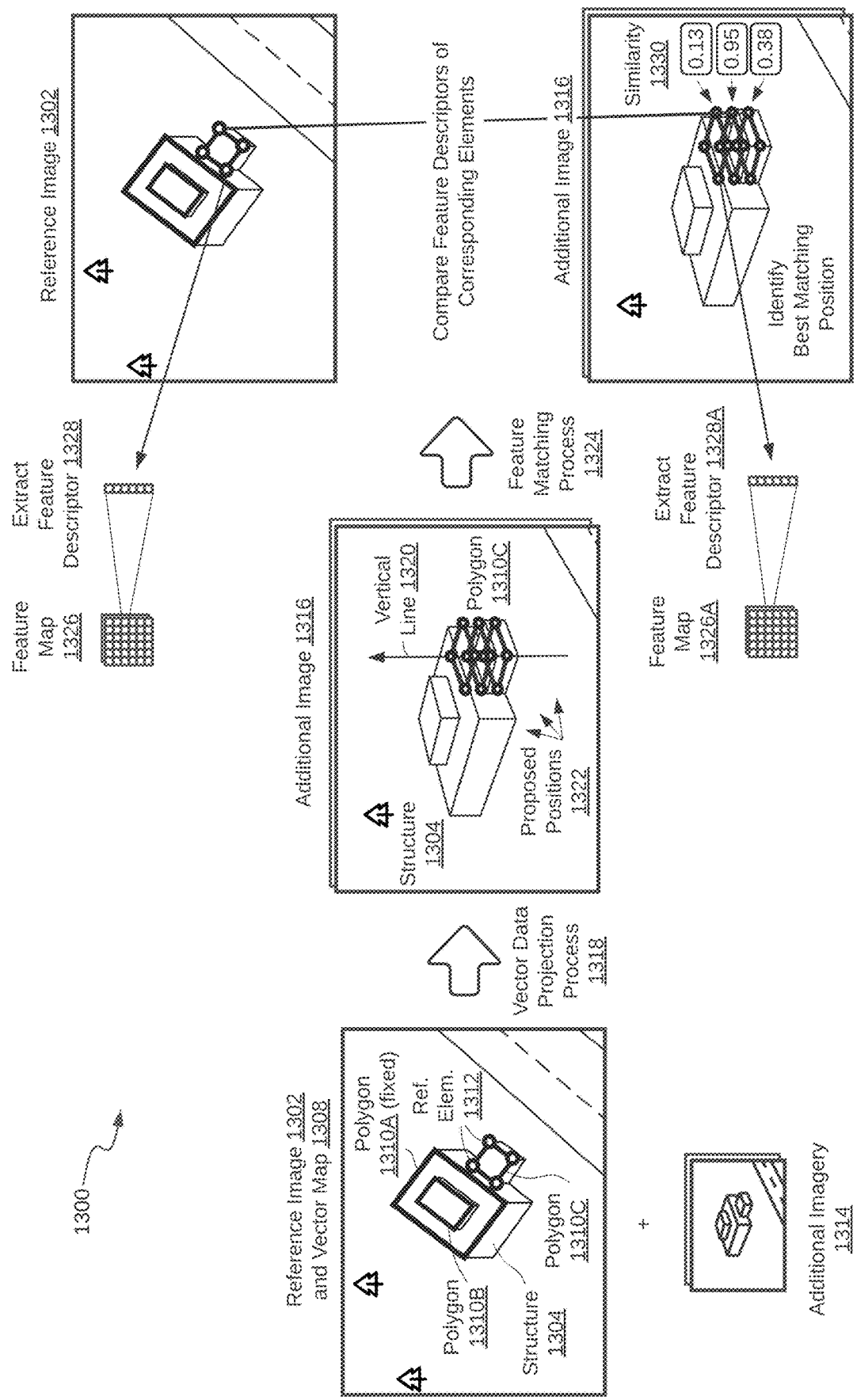
FIG. 13 is a schematic diagram illustrating another example vector data projection and feature matching process to be applied in the case where a structure has multiple roof sections at different heights.

An example of this modified (i.e., multiple roof section) vector data projection and feature matching process is illustrated in FIG. 13, indicated as vector data projection and feature matching process 1300.

In FIG. 13, a structure 1304 comprising several roof sections with different heights (e.g., similar to the structure 1104C of FIG. 11) is represented by several polygons 1310A, 1310B, 1310C of a vector map 1308. Each polygon 1310 represents a different roof section of the structure 1304, derived from overhead imagery (i.e., reference image 1302). In the present example, the polygon 1310A is the "lead" polygon that is fixed in three-dimensional space. The X and Y coordinates of the remaining polygons 1310B and 1310C are fixed with respect to this "lead" polygon based on the vector map 1308. The Z coordinate (i.e., the height) of these remaining polygons 1310B, 1310C may be determined by leveraging additional imagery 1314 captured from one or more additional points of view.

Taking the polygon 1310C for example, by applying a vector data projection process 1318, the polygon 1310C (or at least the points comprising each of the associated reference elements 1312 that are to be used in the feature matching process 1324) are projected into an additional image 1316 at one more proposed positions 1322. As described above, the proposed positions 1322 are spaced apart along a vertical (Z) line 1320. The proposed positions 1322 may be spaced apart according to any suitable predetermined or dynamically determined interval. An initial guess as to the height of the structure 1304 may be obtained from a heuristic or from a reference dataset such as a DSM.

A feature matching process 1324 is applied to each of the vector data projections (i.e., the reference elements 1312 as projected into the reference image 1302 and as projected into each additional image 1316) to determine a best matching position for the polygon 1310C in three-dimensional space (i.e., along the vertical or Z-direction in the three-dimensional coordinate system). As in the previously described process, the feature matching process 1324 involves an element-by-element comparison on the reference elements 1312 at each proposed position 1322 on the basis of the feature descriptors 1328/1328A associated with each compared reference element 1312 derived from feature maps 1326/1326A. An indication of similarity 1330 between feature descriptors 1328/1328A for one of the reference elements 1312 at each proposed position 1322 in the additional 1316 is provided (e.g., similarity scores of 0.13, 0.95, and 0.38 respectively for the three shown proposed positions 1322).

The comparison of the feature descriptors 1328/1328A of each reference element 1312 may yield a best matching position for the polygon 1310C in the vertical or Z-direction. In combination with the fixed X and Y coordinates as per the vector map 1308, the polygon 1310C may thereby be positioned in three-dimensional space.

Since the polygon 1310C is projected into the additional image 1316 at one or more proposed positions along the vertical line 1320 (rather than along a ray extending from the polygon 1310C to the reference camera), the epipolar constraint is broken, and the polygon 1310C at its new three-dimensional position may not precisely align with the polygon 1310C as projected into the reference image 1302 (i.e., the reprojection error may be significant). In such cases, it may be advantageous to correct for this error, or to limit the degree to which the three-dimensional position of the polygon 1310C is permitted to deviate from its original projection in the reference image 1302. For example, any proposed positions 1322 that cause the polygon 1310C to deviate from its original projection in the reference image 1302 beyond a tolerance (i.e., threshold) amount (e.g., 3 pixels, 1 meter, or another amount) may be removed from consideration, thereby ensuring that the determined three-dimensional position of the polygon 1310C does not deviate too significantly from the epipolar constraint. In other cases, where the deviation in XY position is significant, this may be an indication that the projected polygon should not be grouped together in fixed relationship with the others, and the case may be flagged for further analyses (e.g., human involvement).

The above-mentioned process may be repeated for each remaining polygon in the group of polygons (i.e., polygon 1310B) until each polygon that represents a roof section of the structure 1304 is positioned in three-dimensional space. Once positioned in three-dimensional space, the real-world height of each polygon 1310 may be determined using reference data as described in FIG. 4 or FIG. 5. A three-dimensional representation of the structure 1304 may be generated based on the combined polygonal data and represented in a number of ways, similar to as described in FIG. 6A, 6B, or 6C. For example, the structure 1304 may be represented in vector data by three two-dimensional polygons (some of which may be overlapping or adjacent to one another) attributed with height information. In another example, the polygonal data may be combined to generate a three-dimensional wireframe model.

Thus, the systems and methods described herein teach how a two-dimensional vector data representation of a roof of a structure derived from an overhead point of view can be leveraged, in combination with additional imagery captured from one or more additional points of view, to determine the height of a structure, by fixing two-dimensional vector data in three dimensions at the height of the structure. The structures that may be modeled this way include structures with generally planar roofs, roofs with complex geometry (e.g., pitched roofs), and even with multiple roof sections of varying height. The techniques described herein may be particularly useful for rapidly generating three-dimensional representations of structures at scale where an existing database of two-dimensional vector data is readily available or may be readily generated. Applications include extracting geospatial data for use in virtual or augmented reality environments, gaming, for city planning and land use planning, architectural and engineering work, for automated vehicle navigation, for the generation of a digital twin of a city, among others.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method comprising:
obtaining a first image that depicts a structure from a first overhead point of view, two-dimensional vector data generated with reference to the first image that defines a polygon that outlines a roof of the structure, and one or more additional images depicting the structure from one or more additional overhead points of view;
determining camera parameters for each of the images;
projecting, based on the determined camera parameters, one or more reference elements derived from the polygon into each of the additional images at one or more proposed positions, wherein the one or more proposed positions are spaced apart along a projection ray extending from the polygon to a camera used to capture the first image;
applying a machine learning model to generate feature descriptors corresponding to (i) at least the one or more reference elements as projected into the first image, and (ii) at least the one or more reference elements as projected into each of the additional images at each of the one or more proposed positions;
feature matching the feature descriptors corresponding to the reference elements in the first image and in each of the additional images at each of the proposed positions; and
determining, based on the feature matching, a best matching position at which the polygon is most closely aligned with the roof of the structure, thereby fixing the polygon in a three-dimensional position.

2. The method of claim 1, wherein the structure comprises a building with a generally planar roof.

3. The method of claim 1, wherein the structure comprises a building with irregular roof geometry, and wherein the polygon outlines the structure at a base of the irregular roof geometry.

4. The method of claim 1, wherein the first overhead point of view comprises a substantially nadir point of view.

5. The method of claim 1, wherein at least one of the additional points of view comprises an oblique point of view.

6. The method of claim 1, further comprising generating a three-dimensional vector data representation of the structure based on the best matching position of the polygon.

7. The method of claim 1, further comprising determining a real-world height of the structure based on the three-dimensional position of the polygon and further based on reference data.

8. The method of claim 7, wherein the reference data comprises a reference elevation beneath the structure derived from a digital terrain map (DTM).

9. The method of claim 7, wherein the reference data comprises a reference length, derived from one or more of the images, corresponding to the length of a vertical structural member connecting the roof of the structure to the ground.

10. The method of claim 1, wherein the reference elements include one or more corner points of the polygon.

11. The method of claim 1, wherein the feature matching is performed using a machine learning model configured to generate feature descriptors for the reference elements to be compared for similarity, and alignment with the roof of the structure is determined based on comparing the similarity of such reference elements.

12. The method of claim 11, wherein the machine learning model is trained using contrastive learning to generate similar feature descriptors for corresponding reference elements and dissimilar feature descriptors for non-corresponding reference elements.

13. The method of claim 12, further comprising:
generating a set of image pairs and corresponding feature descriptors for training the machine learning model;
training the machine learning model using contrastive learning with the generated set of image pairs and corresponding feature descriptors;
wherein generating an image pair and corresponding feature descriptors comprises:
extracting, from a training image that depicts one or more structures from an overhead point of view, a set of key points and associated feature descriptors associated with the key points; and
applying one or more photometric augmentations and homographic transformations to the training image to generate a transformed image;
applying the homographic transformations to the set of key points to generate a set of transformed key points; and
extracting, from the transformed image, feature descriptors associated with the transformed key points;
wherein the training image and the transformed image comprise the image pair.

14. The method of claim 1, wherein the one or more proposed positions are based on an initial guess for a height of the structure derived from a digital surface map (DSM).

15. A method comprising:
obtaining a first image that depicts a structure from a first overhead point of view, two-dimensional vector data generated with reference to the first image that defines a group of polygons that outline two or more roof sections of the structure, at least two of the roof sections having a different real-world height, and one or more additional images depicting the structure from one or more additional overhead points of view;
determining a lead polygon from the group of polygons;
determining a three-dimensional position of the lead polygon by:
projecting one or more reference elements derived from the lead polygon into each of the additional images at one or more proposed positions, wherein, for each additional image, the proposed positions are spaced apart along a ray extending from the lead polygon to a camera used to capture the first image;
applying a machine learning model to generate feature descriptors corresponding to (i) at least the one or more reference elements derived from the lead polygon as projected into the first image, and (ii) at least the one or more reference elements derived from the lead polygon as projected into each of the additional images at each of the one or more proposed positions;
feature matching the feature descriptors corresponding to the reference elements in the first image and in each of the additional images at each of the proposed positions; and
determining, based on the feature matching, a best matching position at which the lead polygon is most closely aligned with the roof section associated with the lead polygon in the one or more additional images, thereby fixing the lead polygon in three-dimensional space; and
determining a three-dimensional position of each of the remaining polygons of the group of polygons, by, for each remaining polygon:
projecting one or more reference elements derived from the remaining polygon into each of the additional images at one or more proposed positions, wherein, for each additional image, the proposed positions are spaced apart in a vertical direction;
applying a machine learning model to generate feature descriptors corresponding to (i) at least the one or more reference elements derived from the remaining polygon as projected into the first image, and (ii) at least the one or more reference elements derived from the remaining polygon as projected into each of the additional images at each of the one or more proposed positions;
feature matching the feature descriptors corresponding to the reference elements in the first image and in each of the additional images at each of the proposed positions; and
determining, based on the feature matching, a best matching position at which the remaining polygon is most closely aligned with the roof section associated with the remaining polygon in the one or more additional images, thereby fixing the remaining polygon in three-dimensional space.

16. The method of claim 15, wherein, for each of the remaining polygons of the group of polygons, the proposed positions are fixed with respect to a ground plane based on the two-dimensional vector data.

17. The method of claim 15, wherein:
at least one of the roof sections is nested within another roof section; or
at least two of the roof sections are substantially adjacent to one another.

18. The method of claim 15, wherein selecting the lead polygon from the group of polygons comprises:
selecting the largest polygon from the group of polygons;
selecting the polygon with the least occlusion in the first image and/or the one or more additional images;
selecting, based on a previously applied projection and feature matching process applied to each of the polygons in the group of polygons, the polygon that is most closely aligned with the roof section with which it is associated; or
selecting, based on a previously applied projection and feature matching process applied to each of the polygons in the group of polygons, the polygon at the greatest height.

19. A method comprising:
obtaining a first image that depicts a structure from a first overhead point of view, two-dimensional vector data generated with reference to the first image that defines a polygon that outlines a roof of the structure, and one or more additional images depicting the structure from one or more additional overhead points of view;
determining camera parameters for each of the images;
projecting, based on the determined camera parameters, one or more reference elements derived from the polygon into each of the additional images at one or more proposed positions, wherein the one or more proposed positions are spaced apart in a vertical direction;

applying a machine learning model to generate feature descriptors corresponding to (i) at least the one or more reference elements as projected into the first image, and (ii) at least the one or more reference elements as projected into each of the additional images at each of the one or more proposed positions;

feature matching the feature descriptors corresponding to the reference elements in the first image and in each of the additional images at each of the proposed positions; and determining, based on the feature matching, a best matching position at which the polygon is most closely aligned with the roof of the structure, thereby fixing the polygon in a three-dimensional position.

20. The method of claim 19, further comprising determining a real-world height of the structure based on the three-dimensional position of the polygon and further based on reference data.

* * * * *